United States Patent [19]
Gannett

[11] 3,953,678
[45] Apr. 27, 1976

[54] SPEECH COMPONENT KEY SIGNALING SYSTEM WITH CODE COMBINATIONS

[75] Inventor: Danforth K. Gannett, Mountain Lakes, N.J.

[73] Assignee: Bell Telephone Laboratories, Incorporated, Murray Hill, N.J.

[22] Filed: May 10, 1945

[21] Appl. No.: 592,965

[52] U.S. Cl. .............................................. 179/1.5 R
[51] Int. Cl.[2] .............................................. H04L 9/02
[58] Field of Search ......... 179/1.5, 1.5 PCM, 1.5 R; 178/44, 71

[56] References Cited

UNITED STATES PATENTS 2,262,838 11/1941 Deloraine et al. ................ 178/71 K
2,272,070 2/1942 Reeves ......................... 178/44;12 B

*Primary Examiner*—Malcolm F. Hubler
*Attorney, Agent, or Firm*—H. A. Burgess

EXEMPLARY CLAIM

1. In secret telephony, means to analyze input speech waves into low frequency speech-defining currents simultaneously existent in a plurality of separate circuit paths, means to add secret key currents to each speech-defining current to produce summation currents, means for periodically measuring the magnitude of each summation current, means to indicate the magnitudes of said currents by code combinations of pulses of equal number having fixed amplitudes, means to impress each pulse of the code combinations existing at any one time upon a different individual line, and means to continually alter the order of the lines upon which said pulses are impressed.

9 Claims, 8 Drawing Figures

FIG. 2

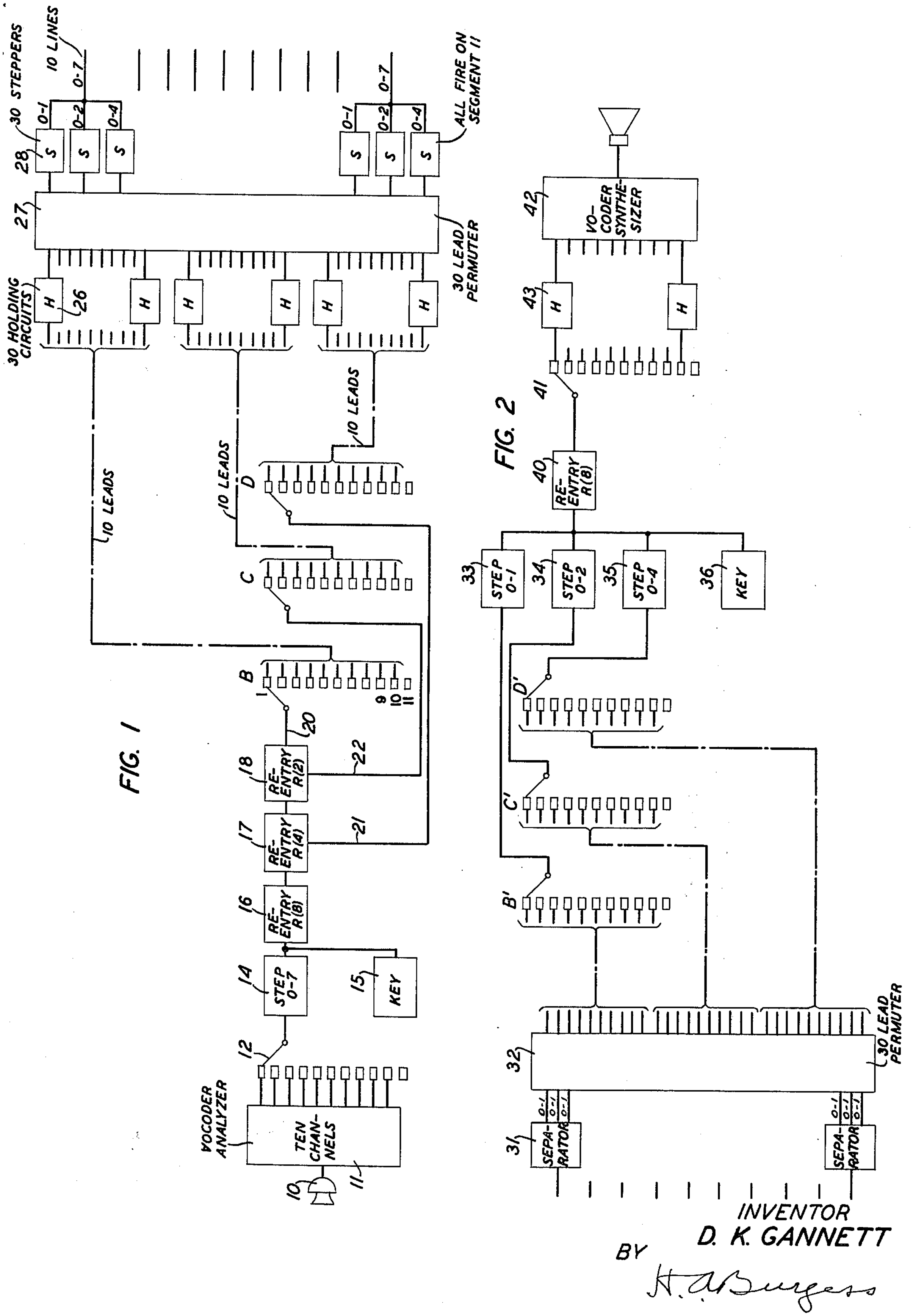
INVENTOR
D. K. GANNETT
BY H. A. Burgess
ATTORNEY

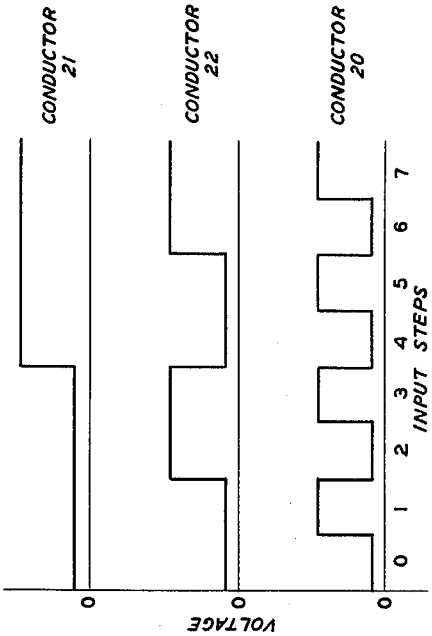
FIG. 3A
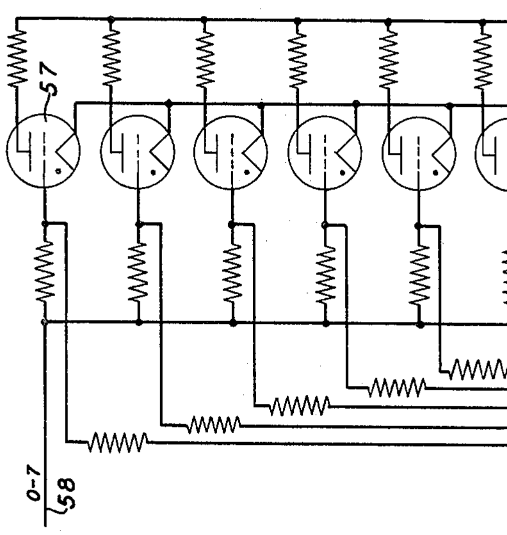
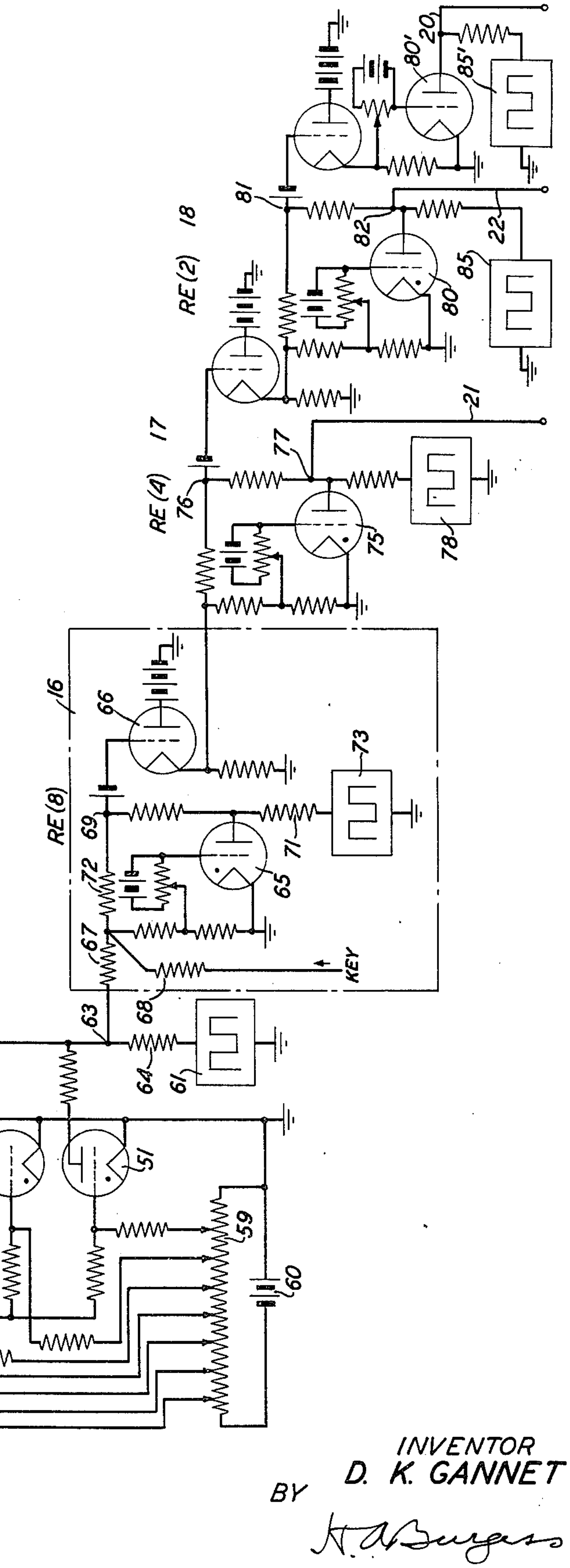
FIG. 3
INVENTOR
D. K. GANNET
BY
H. A. Burgess
ATTORNEY

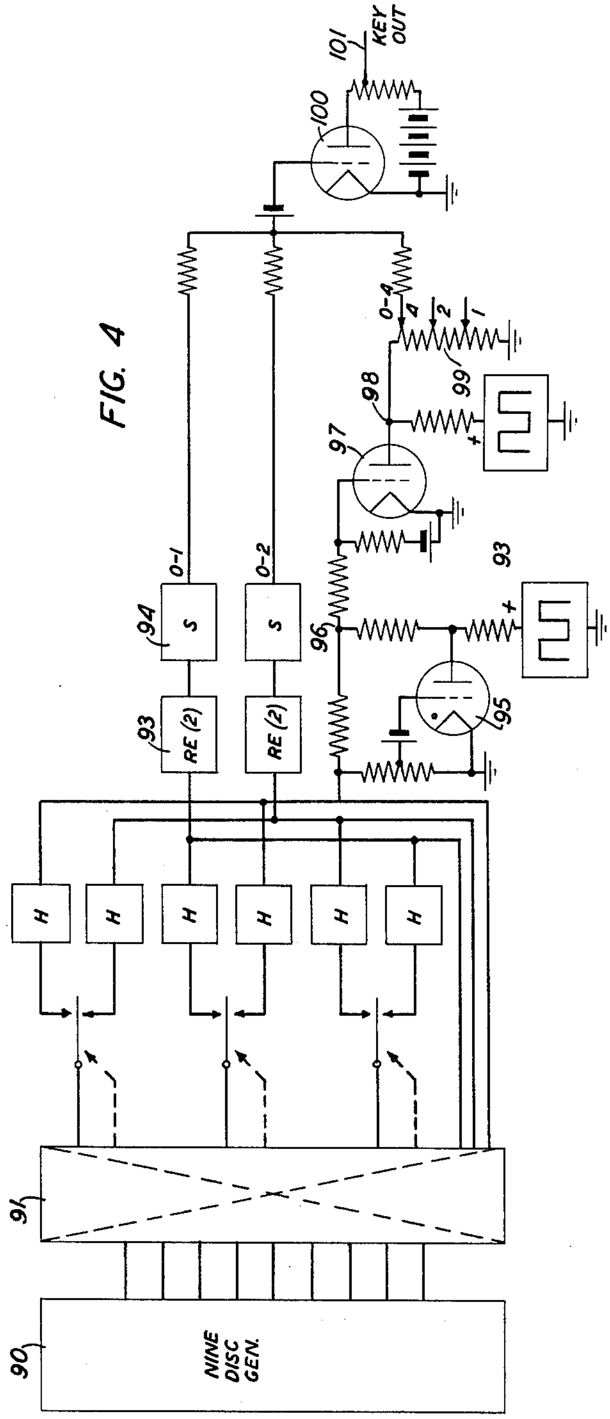
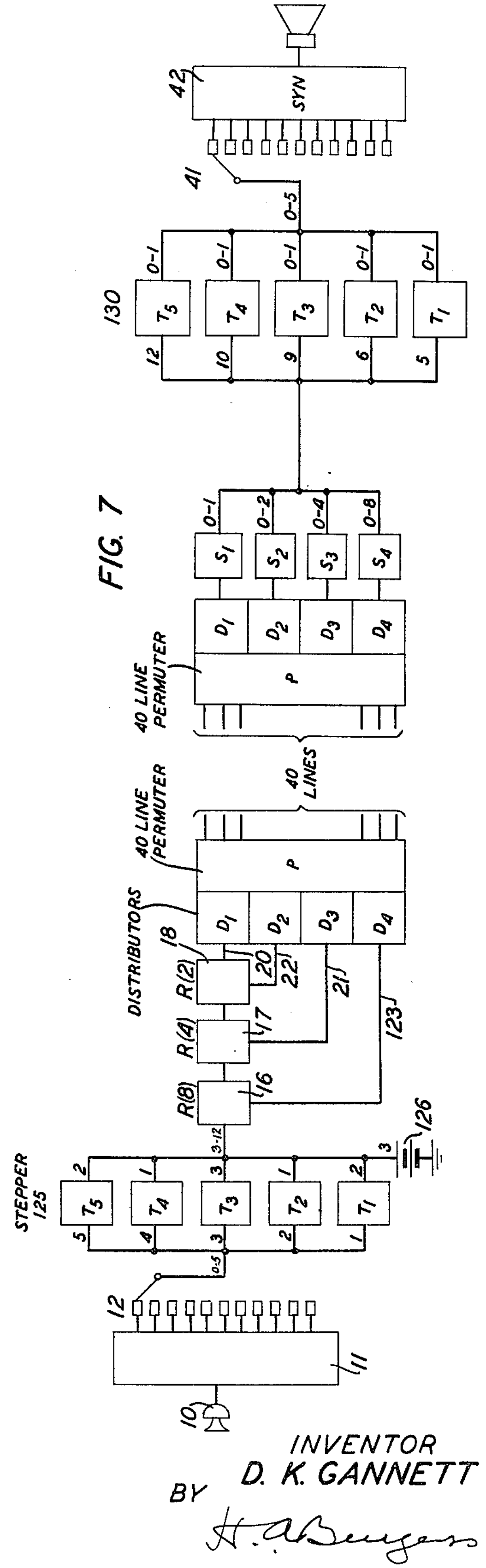
INVENTOR
D. K. GANNETT
BY H. A. Burgess
ATTORNEY

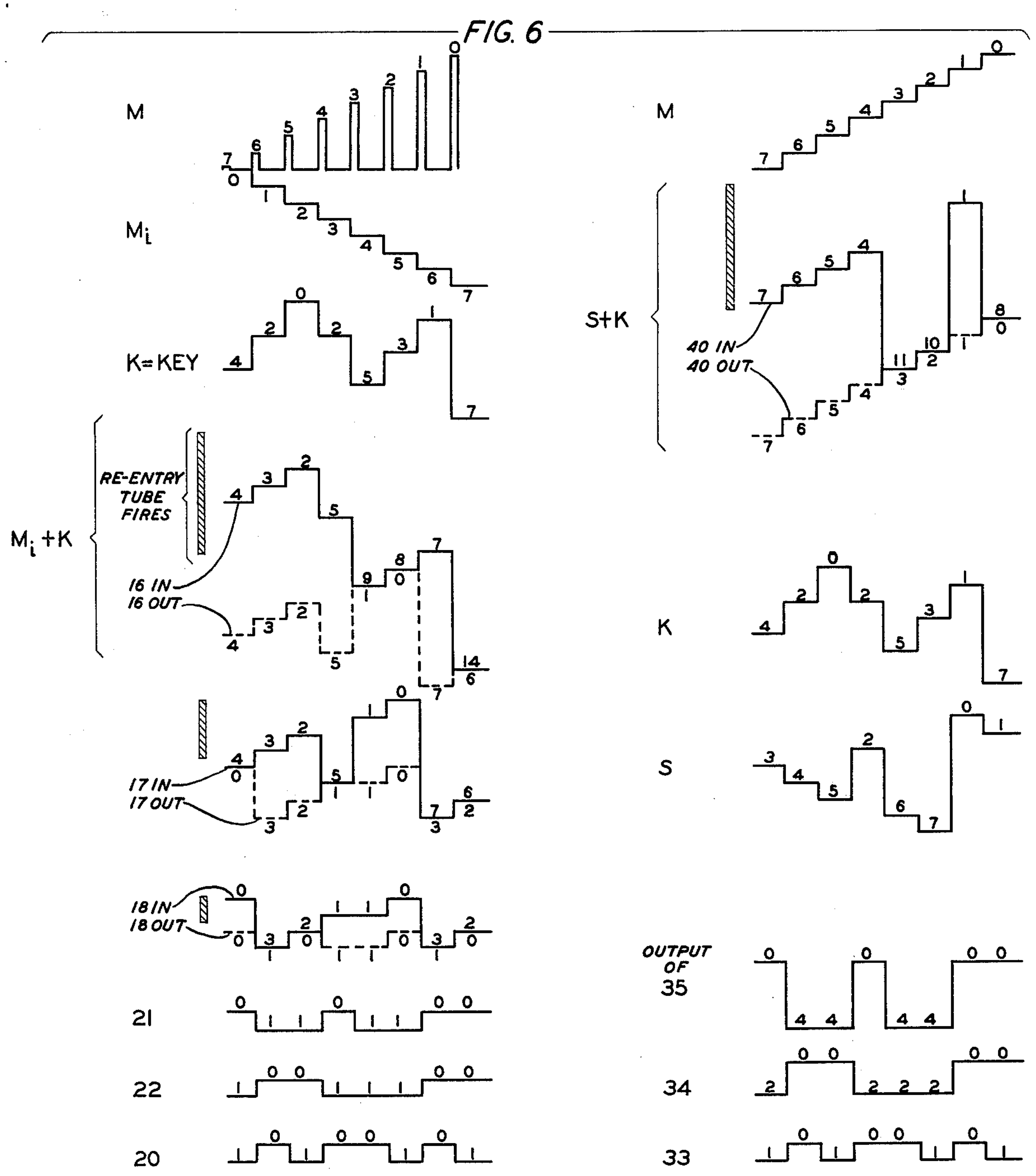
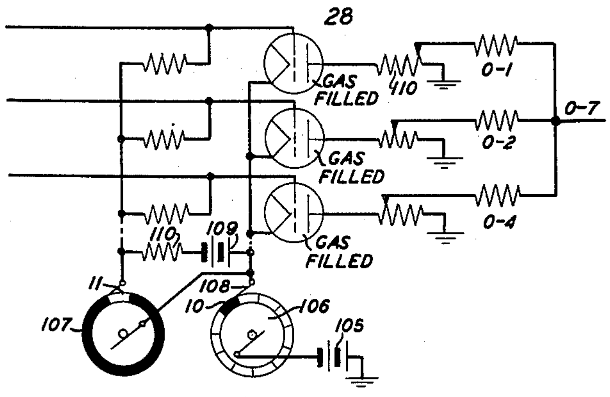
FIG. 5
INVENTOR
D. K. GANNETT
BY H. A. Burgess
ATTORNEY

SPEECH COMPONENT KEY SIGNALING SYSTEM WITH CODE COMBINATIONS

The present invention relates to the transmission of speech or similar signals with secrecy, and more especially to a system in which the signals are, in connection with the enciphering, transmission and deciphering, represented by code combinations of currents of fixed and predetermined values which may, for example, comprise merely "off" and "on" current conditions or marks and spaces.

It has been proposed heretofore to employ code combinations of pulses or currents of this sort and to make use of codes comprising an even number of elements, each combination containing an equal number of marks and spaces. It has been suggested that with such a code the same average number of marks and spaces are transmitted in the idle condition as in the signaling condition so that it is impossible for an outsider to tell whether or not signals are passing over the system at any particular time. In the known system referred to, each element of a code combination is impressed on an individual circuit and these circuits are continually interchanged by means of suitable switching apparatus to provide secrecy in the transmission.

The present invention is in the nature of an improvement upon this previously suggested system and aims to reduce the total number of elemental code circuits thereby reducing the number of necessary transmission channels and also the required width of frequency band for transmission between stations. The invention accomplishes this aim without any diminution in secrecy or in quality of over-all transmission. The invention not only comprehends a novel system as has been generally indicated but also includes as features certain novel circuit combinations that have been devised in the carrying out of the general plan of system, and certain of these will be claimed apart from the system aspects of the invention since they are useful in other fields of application, and could be used to advantage in a system of the previously suggested type referred to, for example.

In the system according to the present invention the number of transmission channels and, therefore, the required band width, is reduced by using fewer code elements per code combination, such as three in place of four and in providing a key of such character as to cause the same average number of pulses and same average energy to be sent during idle times as when signals are sent.

The nature and objects of the invention, as well as its various features, will appear more fully from the following detailed specification including the drawings in which:

FIG. 1 is a block schematic diagram of the circuit at a transmitting station according to the invention;

FIG. 2 is a similar representation of the circuit at a receiving station according to the invention;

FIG. 3 is a detail schematic circuit diagram of the stepper and reentry circuits that would be used in the circuit of FIG. 1;

FIG. 3A is a diagram showing types of pulses produced in the circuit of FIG. 3;

FIG. 4 is a schematic circuit diagram of the key assumed in FIGS. 1 and 2;

FIG. 5 is a detail circuit diagram of the output steppers of FIG. 1;

FIG. 6 is a diagram showing the character of the pulses employed in transmission through the system; and FIG. 7 is a block schematic diagram of a quantizer, converter and restorer according to the invention that may be used in systems employing code combinations of even number of pulses.

Referring first to FIG. 1, showing the transmitting station, speech waves spoken into microphone 10 or received from a telephone line or other source are impressed upon a vocoder analyzer 11 in which a number of low frequency speech-defining waves are derived in accordance with the teachings of Dudley U.S. Patent No. 2,151,091, granted March 21, 1939. These comprise a pitch-defining current and a number of spectrum-defining currents in respective channels or paths, each such current being in the form of a direct current varying at a slow rate the maximum frequency being of the order of 25 cycles per second or less. It is assumed for illustration that there are nine spectrum channels and one pitch channel, making ten channels in all, and that these are brought out to ten segments of the distributor 12. This distributor may be of any suitable type such as mechanical or electronic or comprising individual relay contacts operated in succession. The common output terminal or "brush" is connected to the message stepper 14. Segment No. 11 is an idle segment provided to allow time for performing certain switching operations.

Assuming reasonable values for illustration, the distributor may be considered to sample each channel every 22 milliseconds and since there are eleven channels the interval between successive contacts is 1/500th second. Signal pulses every 0.002 second are, therefore, impressed on stepper 14. The duration of circuit closure at each segment will be relatively short and may, for example, be 0.2 millisecond as will be further explained later on. The stepper 14 distinguishes only eight values of signal current including zero as one value. Its output current varies, therefore, in steps from 0 to 7 steps.

The key 15 also produces pulses occurring in steps 0 to 7 and at the rate of 500 pulses per second. These have a highly irregular type of variation of amplitude with time. They could be derived from a phonograph record as in the disclosure of R. L. Miller application Ser. No. 542,975, filed June 30, 1944 but in the present disclosure are assumed to be produced by the circuit of FIG. 4 to be described at a later point. The key pulses occur in synchronism with the stepper output pulses and are added thereto in the input of the first reentry circuit 16. The summation pulses have a total range of values of zero to fourteen steps. The reentry 16 reenters at step 8 and reduces its output current by eight steps whenever the summation current has the value step 8 or greater. The total range of pulse values impressed on the second reentry circuit 17 is, therefore, 0 to 7. Reentry circuit 17 has a reentry value of 4, meaning that it reduces its output by four steps whenever the impressed pulses have values of four steps or greater. The range of step values impressed on reentry 18 is, therefore, zero to three steps. Reentry 18 has a reentry value of 2, meaning that pulses of only zero or one step are impressed on its output lead 20.

The details of the reentry circuits will be given in connection with FIG. 3. As will be explained, the diminution in the output current is dependent upon whether or not a discharge tube in the circuit is in non-conducting or in conducting condition. Leads 21 and 22 from reentry circuits 17 and 18, respectively, have a pulse or high current (mark) produced in them when the tube in the corresponding reentry has one of these two conditions and zero or low current (space) when the tube has the other of the two conditions. Each of the three leads 20, 21 and 22, therefore, has impressed on it either a mark or a space in each distributor contact time.

These three leads are connected to respective brushes of rotary distributors B, C and D which operate in synchronism with distributor 12. Each of these is an eleven-segment distributor with segments 1 to 10 active and segment 11 dead as in the case of distributor 12. The ten active segments of distributor B are wired to the input circuits of the first ten of a group of thirty holding circuits 26, while the active segments of distributors C and D are wired to the remainder of these holding circuits. Each of these holding circuits may be of the same type as those disclosed in the Miller application referred to, that is, a shunt condenser in the grid circuit of a tube for receiving a charge from the brush through a segment of its distributor and for holding the charge substantially unchanged until contact is next made between the brush and its distributor segment when a new charge is received.

These thirty holding circuits are connected to the permuter 27 which may be of any known and suitable type for variously interconnecting the thirty input terminals to the thirty output terminals in irregular manner. It may, for example, consist of mechanical or electronic switches which are stepped once per rotation of the distributors B, C, D, at some point in their rotation other than at segment 11. The object is to permute the thirty leads among themselves so that the input voltages on the individual leads are distributed over the output leads in an ever varying pattern without repetition within a considerable period of time. The details of this permuter are not illustrated since such devices are known in the art and may include rotary switches, cams, relays, etc. whose movements are timed from the same shaft which drives the distributors B, C and D. The output leads from the permuter 27 are connected to thirty individual steppers 28 which will be described in connection with FIG. 5. These steppers contain gas tubes which fire on distributor segment 11 provided a mark is present on the corresponding stepper input lead. The tubes that fire remain fired until just before segment 11 is again reached. These steppers apply weighting to the output pulses such that when certain steppers fire the output current has a value of one step, while certain other steppers produce output current of two-step value and others of four-step value. The output current is, therefore, either zero in case a stepper does not fire or one of the step values, one, two or four steps, as indicated on the drawing by the legends 0-1, 0-2, 0-4, adjacent the steppers. These steppers have their outputs multipled in sets of three, each group of three consisting of one of each weighting, making ten output lines or channels sufficient for transmitting the thirty channel currents coming out of the permuter. These thrity channel currents are distinguished on an amplitude basis, each line conveying steps varying from zero to seven. These ten lines may be routed to the distant receiving station in the form of ten individual line circuits but would more usually be sent by some multiplex method such as that used in the Miller disclosure involving modulation of separate carrier waves by the respective line currents.

Referring to FIG. 2, ten channels or lines from a transmitting station of the type shown in FIG. 1 are shown coming in at the left. These lead to separators 31 for recovering from the zero-to-seven step line current three individual channels having current of either 0 or step 1 value, corresponding to the spaces and marks at the input of steppers 28. The thirty individual circuits are thus recovered. The nature of these separators will be described in connection with FIG. 3. The thirty circuits are carried to permuter 32 which is a duplicate of permuter 27 but is reversed from right to left so that its input terminals correspond to the output terminals of permuter 27. It operates in synchronism with permuter 27 to unravel the cross-connections previously made between the thirty circuits and to reproduce in the output leads from the permuter the same signals as were impressed on the permuter 27 of the sending station. These thirty output leads are connected to segments of the three distributors B′, C′ and D′ in the same manner as at the transmitting station. The brush of distributor B′ is connected to the input of a stepper 33 which produces zero-or-one step output pulses. The brush of distributor C′ leads to stepper 34 which produces zero-or-two step output pulses, while the brush of distributor D′ leads to stepper 35 which produces zero-or-four step output pulses.

Pulses from steppers 33, 34 and 35 together with key pulses from key source 36 are all applied together in additive sense to the reentry 40. Key source 36 is a duplicate of the key source 15 of the sending station and feeds duplicate key pulses into the reentry 40. The range of current values applied to reentry 40 is from zero to fourteen steps, but the output of this reentry is confined to the range zero to seven steps since the reentry point is at step 8. These output currents from reentry 40 represent the recovered signal after decipherment by means of the key from 36. These pulses are, therefore, applied through output distributor 41 to the ten channels of the vocoder synthesizer 42, holding circuits 43 being interposed to sustain the vocoder channel pulses for the period of the distributor 41. Under control of these restored vocoder channel currents the synthesizer reconstructs the original speech message in accordance with the plan of operation disclosed in the Dudley patent referred to.

In this system as it has been described the secrecy depends in part upon the mixing or scrambling of the thirty circuits by means of the permuter 27, the reverse or unscrambling being accomplished at the receiver by the permuter 32. Further secrecy is, however, contributed by the use of the secret key introduced from source 15, the deciphering by means of key 36 being essential to an understanding of the message. One purpose of using the key in addition to the permuting switches is to cause similar transmission in both the talking and idle periods so that a listener cannot perceive when talking begins or ends and so cannot detect the cadence of the speech. Without the use of the key a difference would exist in the transmitted energy in the talking and idle conditions but since the key supplies pulses varying over the same range as the signal these pulses give the same final average energy output from the transmitter as if speech were being sent. On account of the additional use of the permuters the key can be of a simpler type than would be required for the same degree of secrecy if the key alone were depended upon. In some cases the key can be of quite simple type but there will be described in connection with FIG. 4 a key generator capable of giving a high degree of secrecy especially when used in conjunction with the permuters.

Referring to FIG. 3, the detail circuit is given for the stepper 14 and reentries 16, 17 and 18. The stepper 14 comprises seven gas-filled tubes 51 to 57 all having their grids connected in common to the input conductor 58 leading to the brush of distributor 12 (FIG. 1). A potentiometer resistor 59 and battery 60 supply varying amounts of negative grid bias to the individual tube grids so that these tubes fire in varying numbers depending upon the strength of the impressed signal. A very weak signal will not fire any of the tubes, a slightly stronger signal will fire only tube 51, a still stronger signal will fire only tubes 51 and 52, and so on, the strongest signal firing all seven tubes. These tubes fire only when a positive voltage is applied to their plates. Such voltage is applied in pulses from pulsing supply 61 which is arranged momentarily to interrupt and reapply the voltage while brush 12 is passing over each nonconducting region between two segments of its distributor, the voltage being restored just before the next conducting segment is reached. This prepares the stepper tubes for a fresh exposure at each distributor segment. The combined currents for the stepper tubes flowing in series through resistor 64 cause the voltage at point 63 to vary in steps, the highest voltage corresponding to step 0 and the lowest corresponding to step 7. The signal steps appear inverted in polarity, therefore, at point 63. The construction and operation of the pulsing supply 61 can follow known practice as disclosed by way of example in the Lundstrom-Schimpf application, Ser. No. 456,322, filed Aug. 27, 1942. This pulsing supply can be arranged to apply positive voltage to the stepper tube plates in pulses of definite length as will be explained further on.

The reentry circuit 16 comprises a gas-filled tube 65 and a high vacuum tube 66. The tube 65 has its grid bias adjusted so as to fire on steps 0 to 7 but not to fire on steps 8 to 14. The high resistors 67 and 68 allow the message stepper voltage output and key output to be added and to apply a summation voltage varying in steps over the range zero to fourteen steps as already stated. When the tube 65 fires it draws current through resistor 71 and drops the potential at point 69 by eight steps. Thus, the (positive) voltage at point 69 tends to be raised by eight steps when the tube does not fire, as compared with the cases in which the tube fires.

This is illustrated in FIG. 6 under the left column representing the enciphering steps. In this figure the upper graph illustrates a succession of message pulses M having step values ranging from zero to 7 steps. In order to facilitate the description of the process illustrated in this figure, the arbitrary assumption is made that zero step value is at the topmost position in the case of each graph and that the steps are counted downward. The original message as sampled by the distributor 12 and applied to the input of the stepper 14 is in the form of short pulses M. These are inverted in the stepper 14 giving pulses $M_i$. The key, K, is added giving the summation pulses $M_i + K$.

The range of step values within which the reentry tube 65 fires is indicated by the vertical cross-hatched bar. The graph $M_i + K$ is really two graphs in one, the solid line representing input to the reentry 16 and the dotted line representing the output pulses. When the tube 65 fires, no reentry occurs and the step value remains unchanged. When tube 65 fails to fire, the voltage at point 63 is actually raised by eight steps as stated but the step value of the pulse is reduced by this amount since the pulses are measured downward. In order to represent this in the double graph representing $M_i + K$, the pulses of small step value corresponding to the no-reentry case are shifted in the figure to the dotted line level and it will be seen that those input pulses having step values of eight or greater are reduced in step value by eight steps as indicated by the two step value designations, the one above the pulse applying to the situation before reentry and the one below the pulse applying to the step value after reentry has taken place. In other words, the only pulses that have undergone a change in step value are the large summation pulses of eight step value or greater. It will be understood that the total range of voltage steps impressed on the grid of tube 66 is zero to seven steps and is the resultant of the output stepper voltage plus key voltage transmitted through the series resistor 72 with a sudden shift of eight steps in this voltage in the case of certain of the pulses dependent upon firing of tube 65 as described.

The pulsing supply 73 is similar to that at 61 but is displaced slightly in phase so that a message-plus-key voltage is established before the plate voltage is applied to tube 65, as will be more fully indicated.

Tube 66 repeats the output pulses from point 69 to the grid of reentry 17 and presents a low impedance to reentry 17. Reentry 17 operates in the same manner as reentry 16 except that its gas-filled tube 75 has such a bias as to permit this tube to fire on steps 0 to 3 and to fail to fire on steps 4 to 7. This causes the voltage at 76 to vary only to the extent of steps 0 to 3, for on steps 4 to 7 four steps are subtracted. Whenever tube 75 fires, the voltage at point 77 has its minimum value (steps 0 to 3) and it has maximum value when the tube fails to fire (steps 4 to 7). These voltages appear on lead 21 in the manner shown by the graph labeled "conductor 21" in FIG. 3A.

Reentry 18 operates similarly except that the bias on its gas tube 80 is such that this tube fires on steps 0 and 1 and fails to fire on steps 2 and 3. When the tube fires it subtracts two steps of voltage from the output at point 81. On step 0 tube 80' fires putting a space on lead 20, but on step 1 tube 80' fails to fire putting a mark on lead 20. Only two values of output pulses appear, therefore, on lead 20, these being minimum and maximum or spacing and marking. These alternate with each added step of input as shown by the graph in FIG. 3A labeled "conductor 20." Lead 22 receives maximum and minimum voltage (marks and spaces) from point 82 and these each correspond to two steps of change in applied voltage, as shown by the graph in FIG. 3A labeled "conductor 22."

As already noted, there must be some time displacement between the supply pulses generated at 61 and 73 and this is also true of the other supplies shown in FIG. 3. In order to indicate in a purely illustrative non-limiting manner what these time relations might be, certain numerical values will be assumed as follows: The distributor unit time as measured from the beginning of one contact time to the beginning of the next will be taken as 2 milliseconds. The actual duration of each contact closure time in the case of each distributor is 0.2 milliseconds. The length of the supply pulses from source 61 will be taken as 1.8 milliseconds with 0.2 millisecond interruption between pulses, and the pulses from supplies 73, 78, 85 and 85' will be 1.0 millisecond long with 1.0 millisecond interruption. With these values in mind, if a 2-millisecond interval is considered as scaled off between time 0 and time 2 milliseconds, the supply pulse from 61 to the stepper may last from time 0 to time 1.8 on this scale, distributor 12 closes its contact from times 0.1 to 0.3 on the scale, the pulses from 73, 78, 85 and 85' occur respectively at times 0.5 to 1.5, 0.6 to 1.6, 0.7 to 1.7 and 0.8 to 1.8, while the distributors B, C and D each make contact closure from times 1.0 to 1.2 milliseconds. These relations give each gas tube circuit time to stabilize before any use is made of the current flowing through the tube. The pulses supplied to the holding circuits are of 0.2 millisecond duration which is sufficient to enable these circuits to respond. The line pulses endure for approximately 10 distributor intervals or about 20 milliseconds.

While the graphs in FIG. 3A show minimum rather than zero voltage for the spacing condition, the spaces are referred to for convenience as zero and they can readily be made zero by use of a small opposing direct voltage applied between each lead 20, 21 or 22 and whatever circuit is connected to such lead. The transformations that are effected by the reentries 17 and 18 and the currents that finally reach the three leads 20, 21 and 22 are illustrated by the lowermost graphs in FIG. 6, left column.

It is seen from looking at these three series of pulses represented at 20, 21 and 22 (which are sent over three different channels) that in the first time interval the code pulses are, reading from the top down, mark, space, space. In the second time interval the code space, mark, mark is sent, etc.

The right-hand column of FIG. 6 when read from the bottom upward shows the transformations gone through in deciphering the message at the receiver. The code pulses are received and differently weighted as represented for the output pulses from steppers 33, 34 and 35. When these are added to one another, the graph S immediately above is obtained. The key, K, is then added giving the summation S and K which is reentered at step 8 to give the resulting steps indicated by dotted line. This has the shape of the original message but in practice may need to be shifted by use of a proper bias to the absolute level of the original message.

It will be noted that in the process of enciphering and deciphering, duplicate keys are used and that in each case the key is added in the same manner to the message or to the received enciphered wave. This is possible because one inversion is made in the system between the points where the two keys are applied and also one other inversion is made external to these two points, in this case in stepper 14. If there are other inversions there must be an even number of them in order to allow for use of keys that have like sign and that are similarly added. Instead of making the second of the two mentioned inversions at the transmitter, ahead of the point where the key is added, it could be made at the receiver after the point where the key is put in.

The enciphering and deciphering processes can be illustrated symbolically using the same notations that appear on FIG. 6. The message M in becoming inverted is subtracted from a constant quantity I.

$M_i = I - M$ $M_i + K = I - M + K$ in the no-reentry case. This is again inverted and gives $S = I - [I - M + K] = M - K$ which is the received wave before the key is added. Adding the key K, the message M is obtained.

In the case involving reentry, if the number of steps by which the pulses are reduced upon reentry is R, we have after reentry $I - M + K - R$ $S = I - [I - M + K - R] = M - K + R.$ Adding the key we obtain $M + R$ which after reentry gives $M + R - R = M.$ These expressions are directly applicable to the diagrams on FIG. 6 where I is assumed to equal 7 steps and R to equal 8 steps.

By omitting the reentry 16 (the part enclosed in the broken line rectangle) of FIG. 3, the circuit comprising the remainder of this figure is the type of circuit that would be used as each one of the separators 31 of FIG. 2. The three output leads from the separator, carrying voltages 0 or 1 as indicated in FIG. 2 are the three conductors 20, 21 and 22 of FIG. 3. Conductor 21 (see FIG. 3A) has low or zero voltage for steps 0 to 3, and high voltage for steps 4 to 7; conductor 22 has low or zero voltage for steps 0, 1 and 4, 5 and high voltage for steps 2, 3 and 6, 7; and conductor 20 has high voltage for odd-numbered steps and low or zero voltage for evennumbered steps including zero.

The key producing circuit shown in FIG. 4 employs parts which are identical with corresponding parts disclosed in detail in my prior application Ser. No. 555,913, filed Sept. 27, 1944. As there disclosed, primary off-on pulses are produced by nine rotating discs which have rows of irregularly spaced holes through them with means for projecting light through the holes to photoelectric cells, the rotating discs acting as shutters and causing the production of irregular series of pulses of current in the photoelectric cell outputs. This machine is generally indicated by the rectangle 90 and so far as the present invention is concerned this part 90 could be any other suitable type of device for producing highly irregularly occurring marks and spaces in the nine output leads extending to the right from the box 90. These nine leads are carried through a cross-connecting panel 91 which provides for variously interchanging from time to time or under transmission requirements the connections on one side of the frame to the connections on the opposite side. The outgoing conductors from frame 91 are divided into three groups of three. One group leads to the holding circuits 92; the second group leads (dotted lines) to control circuits for determining which holding circuit receives the pulses, these control circuits being indicated in the figure merely as movable contacts or switches; and the third group extends to three reentry circuits 93. The holding circuits have their outputs paired and each pair also connects to one of the reentry circuits 93.

These holding circuits, as more fully disclosed in my prior application referred to, each comprise a pair of vacuum tubes arranged with a cross-connection from the output side of one to the input side of the other so that one tube of the pair is passing maximum current while the other is passing minimum current. One or more switching tubes are associated with each pair for determining whether the upper or lower holding circuit of a given pair is placed under control of the associated conductor of the first group of three conductors coming from the frame 91. The holding circuit that is so placed under control of the respective conductors puts out marks or spaces under control of pulses received over the respective conductor, while the opposite holding circuit remains in the condition in which it was last placed and continues to put out either continuous marking current or continuous spacing, as the case may be.

The reentries 93 and steppers 94 are all alike except for the weighting used in the outputs of the latter. Each reentry includes a gas tube 95 which (assuming the marks consist of positive current and the spaces zero current) fires only in response to application of two steps of current. On step 0, the potential of point 96 has insufficient value to fire the stepper tube 97 which is normally negatively biased. On step 1, stepper 97 fires due to the increased grid potential. On step 2, tube 95 fire and reduces the potential at point 96 by two steps preventing the stepper from firing. On step 3, tube 95 fires but the stepper tube 97 also fires as in the case of step 1. The potential at point 98 is, therefore, high on reentry input steps 0 and 2 and low on steps 1 and 3. The weighting of the output pulses from the steppers is determined by the points of connection of the output lead to the potentiometer resistor 99, the positions for stepper output step 1, step 2 and step 4 being indicated. The three steppers are set to give, respectively, output steps 0 or 1, 0 or 2 and 0 or 4. These are supplied through a phase reversing tube 100 whose plate current is substantially zero with zero applied pulses, while for stepper output steps 0 to 7 the potential at 101 varies progressively in the negative direction. It will be understood that the pulsing supplies for all the stepper and reentry tubes at one station are timed from a common source and that the necessary phase displacements are made so that the tube in one stage fires at about the middle of the pulse in the output of the next preceding stage.

Referring to FIG. 5, the uppermost group of three steppers 28 of FIG. 1 are shown. These comprise gas-filled tubes whose grids are supplied with marks and spaces from the permuter 27, it being assumed that at this point the marks are positive pulses and the spaces have zero or near zero value of voltage. Negative voltage from source 105 is applied to the cathodes of all thirty tubes in common whenever the circuit breaker 106 has its metal portion in contact with its brush 108. This is the case throughout the entire rotation except for a short segment coinciding in time and phase with the No. 10 segment of distributors B, C and D. The grids are biased highly negative from source 109 at all times except during distributor time 11 by means of a second rotary switch 107 which is interposed in the common return of all of the grid connections to the common cathode connection. The same shaft may drive the distributors and the rotary switches 106 and 107. During distributor time 11, battery 109 and resistor 110 are shorted out by 107. The battery 105 and switch 106 afford a source of interrupted space current supply for the stepper tubes 28. It will be clear that all of those tubes which were in conducting condition when the brush 108 came on to the insulating segment 10 were restored by interruption of their space current supply lead and that as soon as the two brushes come on to the conducting part of their discs in distributor time 11, all those tubes will fire which are receiving a marking voltage on their grids. At the end of distributor time 11 the grids are all biased negative again, allowing the holding circuits 26 and permuter 27 to rearrange the connections to the grids and the voltage conditions on them without affecting the operation of the stepper tubes during distributor times 1 to 10.

The stepper tubes, therefore, put out long pulses of current. These are weighted by potentiometer resistances at 110 in their outputs to cause the three tubes of each group of three to put out, respectively, currents of maximum step values 1, 2 and 4 which add in the outgoing line or channel conductor to give, including zero, all steps from 0 to 7.

FIG. 7 shows how the same types of apparatus elements such as steppers, reentry circuits and permuting switches can be used to code and decode signal currents in a system using a code made up of an even number of two-valued pulses. In this case as previously pointed out the same number of pulses is sent out in both the talking and idle conditions. The use of secret key currents as disclosed in the other figures in accordance with a feature of this invention is not assumed in this modification, therefore.

In this figure, the analyzer 11 and synthesizer 42 together with distributors 12 and 41 may be the same as in FIG. 1. The message stepper 125 has only five tubes $T_1$ to $T_5$ since only six steps 0 to 5 in the signal are in this case assumed to be recognized. Tube $T_1$ fires on one step value and each of the other tubes fires as the steps increase progressively to step 5. The tubes contain weighting networks similar to those described in connection with FIG. 5 for causing the tubes $T_1$ to $T_5$ to put out, respectively, the following step values of current when fired: 2, 1, 3, 1 and 2. When no tubes fire, corresponding to step 0, the battery 126 supplies a voltage of step 3 value. All of the tubes have their outputs connected in common to the input of reentry 16 through high resistances (not shown) which allow the voltages to add in the input of the first reentry circuit. The minimum step value of voltage applied to reentry 16 is, therefore, three and the maximum is twelve, and the intervening steps are seen to be, for progressively increasing signal values, 5, 6, 9 and 10 since the stepper tubes in firing contribute voltage in this sequence and in these amounts.

Reentry circuits 16, 17 and 18 function as previously described in connection with FIG. 1 except that a fourth output lead 123 is supplied for the tube in reentry 16 analogous to leads 21 and 22 for reentries 17 and 18. It is seen that lead 123 has one of two voltage conditions (mark or space) when the signal has step values of zero, one or two and the other voltage condition when the signal has step values of four, five or six. Lead 21 has one of two voltage conditions when the signal has step values zero, three or four and the other voltage condition when the signal has step values of one, two or five. Lead 22 has one of two voltage conditions when the signal has step values one, three or five and the other voltage condition when the signal has step values zero, two or four. Lead 20 has one of two voltage conditions when the signal has step values of two, four or five and the other voltage condition when the signal has step values zero, one or three. These conditions can be more readily perceived by tabulating them, as follows, where one of the two voltage conditions is indicated by S and the other by M:

| Signal value steps | | 0 | 1 | 2 | 3 | 4 | 5 |
|---|---|---|---|---|---|---|---|
| Lead | 123 | S | S | S | M | M | M |
| Lead | 21 | S | M | M | S | S | M |
| Lead | 22 | M | S | M | S | M | S |

-continued

| Signal value steps | 0 | 1 | 2 | 3 | 4 | 5 |
|---|---|---|---|---|---|---|
| Lead 20 | M | M | S | M | S | S |

Each vertical column represents the code for one value of signal current and each code combination is seen to consist of two M's and two S's showing that in all cases the number of pulses sent out is the same whether the signal has zero or some other value.

The pulses on these four leads are distributed by means of the four distributors $D_1$, $D_2$, $D_3$ and $D_4$ over forth circuits and are applied to holding circuits and sent through a forty-lead permuter P, these elements being of the same construction as the corresponding elements of FIG. 1. The transmission is indicated as taking place over these forty conductors to the receiver but it will be clear that any known and suitable type of multiplex transmission can be employed for this purpose.

At the receiver the forty signal circuits are passed through a second permuter P which is a duplicate of the first one but turned around from right to left in the circuit and the leads are thereby restored to their original order and applied to the receiving distributors $D_1$, $D_2D_3$ and $D_4$ the brushes of which connect, respectively, to the four stepper tubes $S_1$ to $S_4$. These are similar to the stepper tubes 33, 34 and 35 and have weighting networks for producing output pulses having, respectively, amplitudes of zero or one step, zero or two steps, zero or four steps and zero or eight steps. They are provided with high resistance voltage adding circuits for connection in common to the stepper 130 the five tubes of which are indicated at $T_1$ to $T_5$. These have bias values such that it requires five steps of input voltage to fire tube $T_1$, six steps to fire tube $T_2$, nine steps to fire tube $T_3$, ten steps to fire tube $T_4$ and twelve steps to fire tube $T_5$. The step values that can be applied to these five tubes from the steppers $S_1$ to $S_4$ are seen to be (in addition to zero) the combinations of 1, 2, 4 and 8 in any one of the six arrangements indicated in the table given above. To illustrate, the combination for zero signal value calls for the summation $0 + 0 + 2 + 1 = 3$ steps. Since this value is less than is required to fire any tube in the stepper 130, zero output is obtained from this stepper. The combination for signal of one step value (second column of table) calls for the addition $0 + 4 + 0 + 1 = 5$ steps which is just sufficient to fire tube $T_1$ of stepper 130 giving unit output. The third combination corresponding to a step two value of signal gives a summation $0 + 4 + 2 + 0 = 6$ steps, or enough to fire tubes $T_1$ and $T_2$ of stepper 130, giving a final output of two steps. The way in which the other signal values are recovered will be obvious from the table and from the description together with the numbers marked on the drawing giving the step values involved. As a result of this action, a zero to five step signal is reproduced on the brush of the final distributor 41 leading to the synthesizer 42.

What is claimed is:

1. In secret telephony, means to analyze input speech waves into low frequency speech-defining currents simultaneously existent in a plurality of separate circuit paths, means to add secret key currents to each speech-defining current to produce summation currents, means for periodically measuring the magnitude of each summation current, means to indicate the magnitudes of said currents by code combinations of pulses of equal number having fixed amplitudes, means to impress each pulse of the code combinations existing at any one time upon a different individual line, and means to continually alter the order of the lines upon which said pulses are impressed.

2. In secret telephony, means to analyze input speech waves into a plurality of low frequency speech-defining currents simultaneously existent in a plurality of separate circuit paths, means to sample the currents in said paths in rotation, means to generate secret key currents in timed relation to said sampling to provide a separate key current for each sample of said speed-defining currents, means to combine individual key currents with the respective samples of speech-defining currents to form enciphered currents, means to produce code pulse combinations each combination consisting of a plurality of elements of fixed amplitude values each code combination representing a different value of said enciphered current, a number of circuits equal to the product of the number of said separate circuit paths by the number of elements per code combination, and means to distribute the pulses representing said code elements in irregular and changing order over said circuits.

3. In secret telephony, means to analyze input speech waves into a plurality of low frequency speech-defining currents flowing in separate circuits, means to add secret key currents to each said speech-defining current to produce summation currents, means to translate instantaneous values of said summation currents into code combinations of marks and spaces comprising means to produce a mark or space depending upon whether the instantaneous value of said summation currents lies within one range of values or another, and means to produce other marks or spaces depending upon whether said instantaneous value lies within one or other of different fractional parts of one of said two ranges, a separate output circuit for each mark and space, and means to interchange said output circuits with one another in irregular manner.

4. In a secret signaling system, a plurality of separate circuits, N in number, carrying signal currents to be enciphered, means to add secret key currents to the signal currents in each circuit to provide summation currents, means to indicate instantaneous values of said summation currents in terms of a permutation code consisting of Q two-valued elements of predetermined fixed values, means to supply each code element to an individual one of NQ output circuits, means to permute said output circuits irregularly and continually with respect to NQ output terminals, and means to transmit indications of the currents impressed upon individual output terminals.

5. A system as claimed in claim 4 comprising a single transmission channel for each of a group of said output terminals, means for combining the currents from the output terminals of any one group into a composite current suitable for transmission over the corresponding channel and means to impress said composite currents upon individual transmission channels.

6. In a signaling system, a plurality of signal circuits N in number, each circuit carrying signals, means to represent each signal by a code combination of Q elements each element of which comprises one of two fixed voltage conditions, means to encipher said signals to disguise their identity, a number equal to NQ of output circuits, means to allot a separate output circuit to each one of the NQ code elements, a permuter for said output circuits for intermixing said output circuits with one another in irregular manner, a plurality of transmission channels, means to combine the code elements from each of a number of groups of said output circuits into a composite current, and means to transmit each such composite current over an individual channel.

7. The method of indicating by a four-element code a signal having six values comprising translating said six values in ascending order into values varying in the relation three, five, six, nine, ten and twelve, determining the first element of the code as of one character if the translated value is less than eight and as of another character otherwise, determining the second element of the code as of one character if the translated value is less than four or is both greater than eight and less than twelve and as of another character otherwise, further translating said translated values into secondary values having the relation, respectively, three, one, two, one, two, zero, determining the third element of the code as of one character if the secondary value is greater than one and as of another character otherwise and determining the fourth element of the code as of one character if the secondary value is odd and as of another character if the secondary value is zero or even.

8. The method of translating a four-element code into a six-valued signal comprising translating the first element of the code into either zero or eight units, translating the second element into either zero or four units, translating the third element into either zero or two units and translating the fourth element into either zero or one unit, adding said units in a common output to produce summation values, translating summation values less than five units into zero signal value, and translating summation values of respectively five, six, nine, ten and twelve units into signal values of one, two, three, four and five units.

9. In a signaling system, a circuit for translating signals having a definite total range of amplitude values to code combination signals consisting of marks and spaces, comprising tandem reentry stages each including a series path and a biased tube shunted thereacross, means to apply said signals to the initial reentry stage, said signals throughout one half of their total range of amplitude values being of insufficient amplitude to overcome the bias on said tube but throughout the other half of their total amplitude range overcoming the bias on said tube thereby causing said tube to pass current, said signals producing output voltages in said initial stage varying over one range of values when the bias on said tube is not overcome, and producing output voltages in said initial stage varying over the same range of values when said tube passes current, means to impress said output voltages upon the second reentry stage, said second reentry stage including such a value of tube bias that said bias is overcome by impressed voltages having values in one half of their total range of variation but is not overcome by impressed voltages having values in the other half of said total range, said second stage producing output voltages varying over one range when its tube bias is not overcome by the voltages impressed upon said second stage and producing output voltages varying over the same range when its tube bias is overcome by the voltages impressed upon said second stage, and three output leads for said marks and spaces, one output lead being connected to the output of said second stage, a second lead being connected to the tube in said second stage and the third lead being connected to the tube in said initial stage, said second and third leads each receiving one value of voltage (mark or space) from its respective tube when such tube is passing current and a different value of voltage (space or mark) when such tube fails to have its bias overcome by the voltage values impressed on the respective stage.

* * * * *